United States Patent [19]

Kubota et al.

[11] Patent Number: 5,913,991
[45] Date of Patent: Jun. 22, 1999

[54] SPLICING DEVICE AND SPLICING METHOD

[75] Inventors: Kazuo Kubota; Hirokazu Komai, both of Kanagawa, Japan

[73] Assignee: Fuji Photo Film Co., Ltd., Japan

[21] Appl. No.: 08/799,362

[22] Filed: Feb. 14, 1997

[30] Foreign Application Priority Data

Feb. 15, 1996 [JP] Japan .................................... 8-028129

[51] Int. Cl.⁶ ............................ B65H 23/00; B32B 31/00
[52] U.S. Cl. ............................ 156/64; 156/159; 156/361; 156/502; 156/505; 242/555.1; 226/22
[58] Field of Search .............................. 156/64, 157, 159, 156/351, 361, 362, 363, 364, 502, 504, 505; 226/19, 20, 21, 22, 23; 242/554.1, 555.1; 269/21

[56] References Cited

U.S. PATENT DOCUMENTS

| 3,879,246 | 4/1975 | Walker | 156/265 |
| 4,003,511 | 1/1977 | Schwestka | 226/3 |
| 4,501,630 | 2/1985 | Kiuchi | 156/159 |
| 4,878,986 | 11/1989 | Nishikawa | 156/504 |

FOREIGN PATENT DOCUMENTS 167917  1/1986  European Pat. Off. .......... B65H 1/18

Primary Examiner—James Engel
Attorney, Agent, or Firm—Brinks Hofer Gilson & Lione

[57] ABSTRACT

A splicing method comprising the steps of: (a) holding a first tape on a first tape guiding portion and a second tape guiding portion which are positioned in alignment with each other; (b) cutting the first tape between the first tape guiding portion and the second tape guiding portion so as to allow a first end portion held on the first tape guiding portion and a second end portion held on the second tape guiding portion to be formed in the first tape; and (c) splicing one of the first end portion and the second end portion to a second tape, wherein a step (d) of detecting whether or not at least one of a portion of the first tape being held on the first tape guiding portion and a portion of the first tape being held on the second tape guiding portion is in a predetermined holding position is effected prior to step (c), and when the at least one is in the predetermined holding position, step (c) is effected. Accordingly, it is possible to dispense with inspection of an acceptable or unacceptable state of spliced portions of the first tape and the second tape.

24 Claims, 13 Drawing Sheets

SPLICING DEVICE AND SPLICING METHOD

BACKGROUND OF THE INVENTION

1. Field of the Invention

The present invention relates to a splicing device which is capable of detecting offset between splicing portions of two elongated tapes when the tapes are spliced along their longitudinal direction, as well as a splicing method.

2. Description of the Related Art

Conventionally, in the process of producing a magnetic tape cassette such as a VHS cassette, a magnetic tape is wound by a winding apparatus into a cassette case which has been assembled in advance in such a state that a pair of reels constituted by a takeup-side reel and a supply-side reel, at which longitudinal ends of a leader tape are respectively retained, are accommodated therein, thereby to complete a magnetic tape cassette.

More specifically, when the magnetic tape is thus wound into the cassette case, the leader tape in the cassette case is first drawn out and is sucked onto a suction table, and the leader tape is cut in the sucked state. Then, one end of the elongated magnetic tape is made to butt against a cut end of the leader tape whose one end is retained at the supply-side reel, the two butting ends are spliced with a splicing tape, and a predetermined length of the magnetic tape is taken up onto the supply-side reel. Subsequently, the magnetic tape is sucked onto the suction table and the magnetic tape is cut, and this cut end and another end of the leader tape whose one end is retained at the takeup-side reel are made to butt against each other and are similarly spliced. Then, the leader tape which has been drawn out from the cassette case and the magnetic tape are finally wound into the cassette, thereby completing the magnetic tape cassette according to the conventional process.

When the magnetic tape and the leader tape are spliced in the above-described production process, there have been cases where the tapes are sucked onto the suction table in a state offset from a proper position due to the effect of a wind or the like, or during the cutting of the tapes, a cutter blade moves the tapes due to its bluntness and the tapes are sucked onto the suction table in a state offset from the proper position. Hence, as shown in FIG. 14, there have been cases where a magnetic tape M and a leader tape L are spliced with a splicing tape S in a mutually offset state.

Accordingly, due to the jutting out of a portion of an adhesive portion of the splicing tape S from the magnetic tape M due to the offset during the splicing of the leader tape L and the magnetic tape M, the jutting-out portion (the aforementioned portion) of the splicing tape S adheres to another portion of the magnetic tape M. As a result, there has been a possibility of the magnetic tape M being cut at the portion where the jutting-out portion of the splicing tape S is adhered.

However, with the conventional winding apparatus, the inspection of the splicing state of the tape is not conducted during the splicing operation, and it has been customary to visually inspect only the spliced state on the side of the takeup-side reel after the completion of the winding of the magnetic tape, or automatically inspect the same by an inspecting machine after the production of the magnetic tape cassette. For this reason, it has been necessary to inspect the spliced portions of the leader tape and the magnetic tape with respect to all the magnetic tape cassettes irrespective of accepted and rejected products, which has been very inefficient. In addition, due to an increase in the number of items to be inspected as a result of inspection of all the cassettes, inspection tends to be unreliable, and there has been an increase in the cost of inspection.

SUMMARY OF THE INVENTION

In view of the above-described circumstances, it is an object of the present invention to provide a splicing device and a splicing method which make it possible to reliably detect the acceptable or unacceptable state of spliced portions of two tapes at the time of splicing at low cost and with high accuracy.

The present inventors devised the present invention on finding out that, instead of the conventional method of inspecting the acceptable or unacceptable state of spliced portions after the splicing of the magnetic tape and the leader tape, if the positions of the magnetic tape and/or the leader tape are detected in a stage before the splicing of the magnetic tape and the leader tape, and if the magnetic tape and the leader tape are spliced when it has been able to confirm that the positions are at predetermined positions, it is possible to omit the conventionally conducted inspection of the acceptable or unacceptable state of the spliced portions after splicing.

Namely, in accordance with a first aspect of the present invention, there is provided a splicing method comprising the steps of: (a) holding a first tape on a first tape guiding portion and a second tape guiding portion which are positioned in alignment with each other; (b) cutting the first tape between the first tape guiding portion and the second tape guiding portion so as to allow a first end portion held on the first tape guiding portion and a second end portion held on the second tape guiding portion to be formed in the first tape; and (c) splicing one of the first end portion and the second end portion to a second tape, wherein a step (d) of detecting whether or not at least one of a portion of the first tape being held on the first tape guiding portion and a portion of the first tape being held on the second tape guiding portion is in a predetermined holding position is effected prior to the step (c), and when the at least one is in the predetermined holding position, the step (c) is effected.

In accordance with a second aspect of the present invention, there is provided a splicing device comprising: a first tape guiding portion and a second tape guiding portion at least one of which is movable to a position of alignment with another one of the first tape guiding portion and the second tape guiding portion; a tape cutting mechanism for causing a first tape being held on the first tape guiding portion and the second tape guiding portion, which are positioned in alignment with each other, in a straddling manner to be cut between the first tape guiding portion and the second tape guiding portion; a splicing mechanism for splicing a cut end of the first tape being held on one of the first tape guiding portion and the second tape guiding portion and a second tape being held in another one of the first tape guiding portion and the second tape guiding portion; and tape-holding-position detecting means which is provided in correspondence with at least one of the first tape guiding portion and the second tape guiding portion, and which is adapted to detect whether or not the first tape is in a predetermined holding position when the first tape is held on the first tape guiding portion and the second tape guiding portion in such a manner as to straddle the first tape guiding portion and the second tape guiding portion.

In a particularly preferred form of the present invention, a multiplicity of ventilation holes are formed in at least one of the first tape guiding portion and the second tape guiding portion, preferably in both of them, and air is sucked through these ventilation holes to allow the first tape held thereon to be sucked by negative pressure. The value of the negative pressure during suction is detected by a pressure sensor, and if this value is less than or equal to a predetermined value, a determination is made that the tape is being held at a predetermined holding position on the first and second tape guiding portions, and the operation proceeds up to the splicing step. Namely, if the multiplicity of holes provided in the first and second tape guiding portions are formed in advance such that if the first tape held thereon is in a predetermined (proper) holding position, all the multiplicity of ventilation holes are covered with the first tape, but if the first tape is offset from the predetermined holding position, at least some of the multiplicity of ventilation holes cannot be covered with the first tape, all the multiplicity of ventilation holes are covered with the first tape if the first tape on the first and second tape guiding portions is in the predetermined holding position. Therefore, the negative air pressure at the time when the first tape is sucked and held by the negative pressure shows a lowest value, and the more the first tape is offset from the predetermined holding position, the greater the number of the ventilation holes which are not covered with the first tape, i.e., the more the areas of the ventilation holes increases, so that the value of the negative air pressure increases. Accordingly, by merely monitoring the value of this air pressure, it is possible to detect whether or not the position of the first tape on the first and second tape guiding portions is in the predetermined holding position, and detect an amount of its offset if it is offset.

Further, if the positions of the multiplicity of ventilation holes formed in the first and second tape guiding portions are adjusted, it is possible to vary the positional accuracy concerning whether the position of the first tape held thereon is in the predetermined holding position. For instance, if the multiplicity of holes are formed in such a range that the first tape cannot cover all the ventilation holes even if the first tape is offset by 0.01 mm from the predetermined holding position, it becomes possible to set the positional accuracy of the first tape in the range of ±0.01 mm. In addition, if the multiplicity of holes are formed in such a range that the first tape cannot cover all the ventilation holes even if the first tape is offset by 0.1 mm, it becomes possible to ensure positional accuracy having an allowance of ±0.1 mm. Thus, the positional accuracy can be provided with a setting having a desired allowance.

In accordance with another aspect of the present invention, at least one of the first tape guiding portion and the second tape guiding portion is formed as a groove having side walls on opposite sides in the transverse direction of the first tape, and the groove is provided with such a width that when the first tape held in the groove is offset from the predetermined holding position, the first tape rides onto one of the side walls. Further, an optical sensor provided with a light-emitting portion and a light-receiving portion is disposed at such a position where its optical path is blocked in a case where the first tape has ridden onto the side wall, and whether or not the first tape being held in the groove is in the predetermined holding position is detected depending on whether the light from the light-receiving portion is received.

In accordance with still another aspect of the present invention, an image of the first tape being held in the first and second tape guiding portions is shot from above by, for example, a CCD camera, and whether or not the first tape being held on the first and second tape guiding portions is in the predetermined holding position is detected on the basis of the shot image. For instance, ultraviolet-ray reflecting regions are formed in advance on the surfaces of the first and second tape guiding portions, such that if the tape held therein is in a predetermined position, the ultraviolet-ray reflecting regions are completely covered, but if it is offset from the predetermined position, the ultraviolet-ray reflecting regions are not completely covered. Then, a shot image is obtained only with the ultraviolet light by the CCD camera, and if the shot image is transformed into a binary image of the portion of the first tape and the remaining portions, it is easily possible to detect whether or not the first tape being held in the first and second tape guiding portions is in the predetermined position.

The above-described detection as to whether or not the first tape on the first and second tape guiding portions is in the predetermined holding position is most preferably effected immediately before the cutting of the first tape between the first tape guiding portion and the second tape guiding portion. However, the detection may be effected anytime before the splicing of the first tape and the second tape. For instance, the detection as to whether or not the two tapes are in predetermined holding positions may be effected in a state in which a cut end portion of the first tape is being held on one of the first and second tape guiding portions, while an end portion of the second tape is being held in another one of the first and second tape guiding portions.

If it is confirmed that the first tape on the first and second tape guiding portions is in the predetermined holding position, operation up to the splicing of the first tape and the second tape is executed in a predetermined step. On the other hand, if the first tape on the first and second tape guiding portions is not in the predetermined holding position, the operation is interrupted, and an alarm signal is issued (it is possible to adopt such means as the issuance of an alarming sound, the lighting of an alarm lamp, and the like). This allows an operator to cancel the holding of the first tape on the first and second tape guiding portions and make a correction by placing the first tape in the predetermined holding position. Alternatively, in the case of the above-described detection based on the negative pressure, the cancellation of suction and the effecting of suction again may be effected automatically or manually by the operator so as to make a correction by allowing the first tape to be held in the predetermined holding position. Then, the operation proceeds to a subsequent step.

In accordance with the present invention, since it is possible to detect whether or not the splicing of the first tape and the second tape can be effected at the predetermined holding position in a stage before the splicing of the first tape and the second tape, inspection efficiency improves as compared with the conventionally practiced inspection of the spliced portions after splicing, and inspection errors can be obviated.

The above and other objects, features and advantages of the present invention will become more apparent from the following detailed description of the invention when read in conjunction with the accompanying drawings.

DESCRIPTION OF THE PREFERRED EMBODIMENTS

Referring now to FIGS. 1 to 10 and FIG. 13, a description will be given of a particularly preferred embodiment of the splicing device and method in accordance with the present invention.

Figure 1:
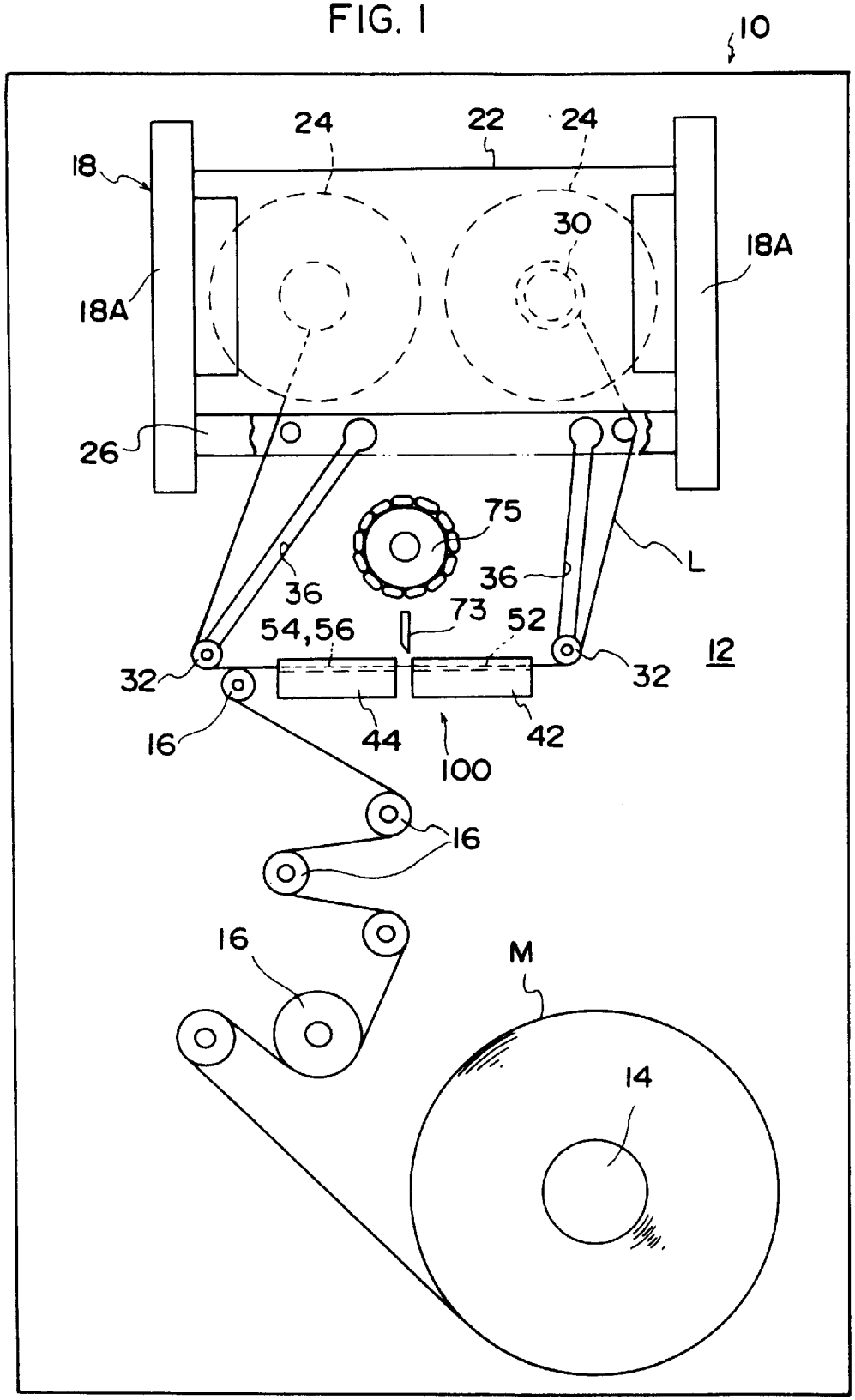
FIG. 1 is an overall schematic diagram of a winding apparatus to which a first embodiment of the present invention is applied.

In a winding apparatus 10 shown in FIG. 1 and to which the embodiment of the present invention is applied, a reel base 14, on which a hub with an elongated magnetic tape M wound therearound is mounted and which is rotated by an unillustrated rotatively driving device, as well as a plurality of transport rollers 16 (at least one of which is a tension roller having a tension controlling function for imparting a desired tension to the magnetic tape being transported) for guiding the magnetic tape M in an upward direction from the reel base 14, are rotatably supported on a baseplate 12, respectively. Further, a cassette holder 18 constituted by a pair of side plates 18A for fixing a cassette case 22 is disposed on the baseplate 12 and above the reel base 14.

A pair of reels 24, at which longitudinal ends of a leader tape L are respectively retained, are incorporated in the cassette case 22, and a cover 26 is provided on the cassette case 22. A pair of unillustrated pins are embedded at positions on the baseplate 12 where the opening and closing of the cover 26 are not hampered, and an abutment surface for positioning on the front side of the cassette case 22 abuts against these pins so as to position and support the cassette case 22.

Accordingly, when the cassette case 22 is supplied and is inserted between the side plates 18A of the cassette holder 18, the cassette case 22 is held in the cassette holder 18 in a state in which the pair of side plates 18A support the left and right side portions of the cassette case 22, the pins support the lower side thereof, and the cover 26 is open.

A rotating shaft 30 of a motor supported in such a manner as to project and retract from the baseplate 12 is disposed at a position on the baseplate 12 corresponding to the supply-side reel 24 located on the right-hand side between the pair of reels 24. For this reason, as the rotating shaft 30 is inserted into a central hole of the supply-side one of the reels 24 accommodated in the cassette case 22, and the rotating shaft 30 rotates in a state of engagement with the reel 24, the supply-side reel 24 is rotated.

Meanwhile, the winding apparatus 10 incorporates an unillustrated guiding mechanism for movably supporting a pair of drawing-out rollers 32, and the guiding mechanism is capable of causing the pair of drawing-out rollers 32 to project and retract from the baseplate 12, and of moving the pair of drawing-out rollers 32 vertically on the baseplate 12 along guide grooves 36.

For this reason, as the pair of drawing-out rollers 32 project from the baseplate 12, are inserted into the cassette case 22, and move on the baseplate 12 downward along the guide grooves 36, the leader tape L is drawn out from the cassette case 22, as shown in FIG. 1.

In addition, an elongated first guide base 42 extending in a substantially horizontal direction (in the left-and-right direction in FIG. 1) is disposed at a position between the cassette holder 18 and the reel base 14. A first guide groove 52 extending along the longitudinal direction of the first guide base 42 is provided on an upper surface of the first guide base 42.

A second guide base 44 is disposed at a position on the baseplate 12 longitudinally adjacent to the first guide base 42. The second guide base 44 is supported such that it can be reciprocated in a direction (in a direction perpendicular to the plane of the drawing of FIG. 1) perpendicular to the baseplate 12 by an unillustrated cylinder incorporated in the winding apparatus 10. A second guide groove 54 and a third guide groove 56, which respectively have the same width as the first guide groove 52 in the first guide base 42, are formed on an upper surface of the second guide base 44 in such a manner as to extend in parallel with each other in the same plane as the first guide groove 52.

Figure 5:
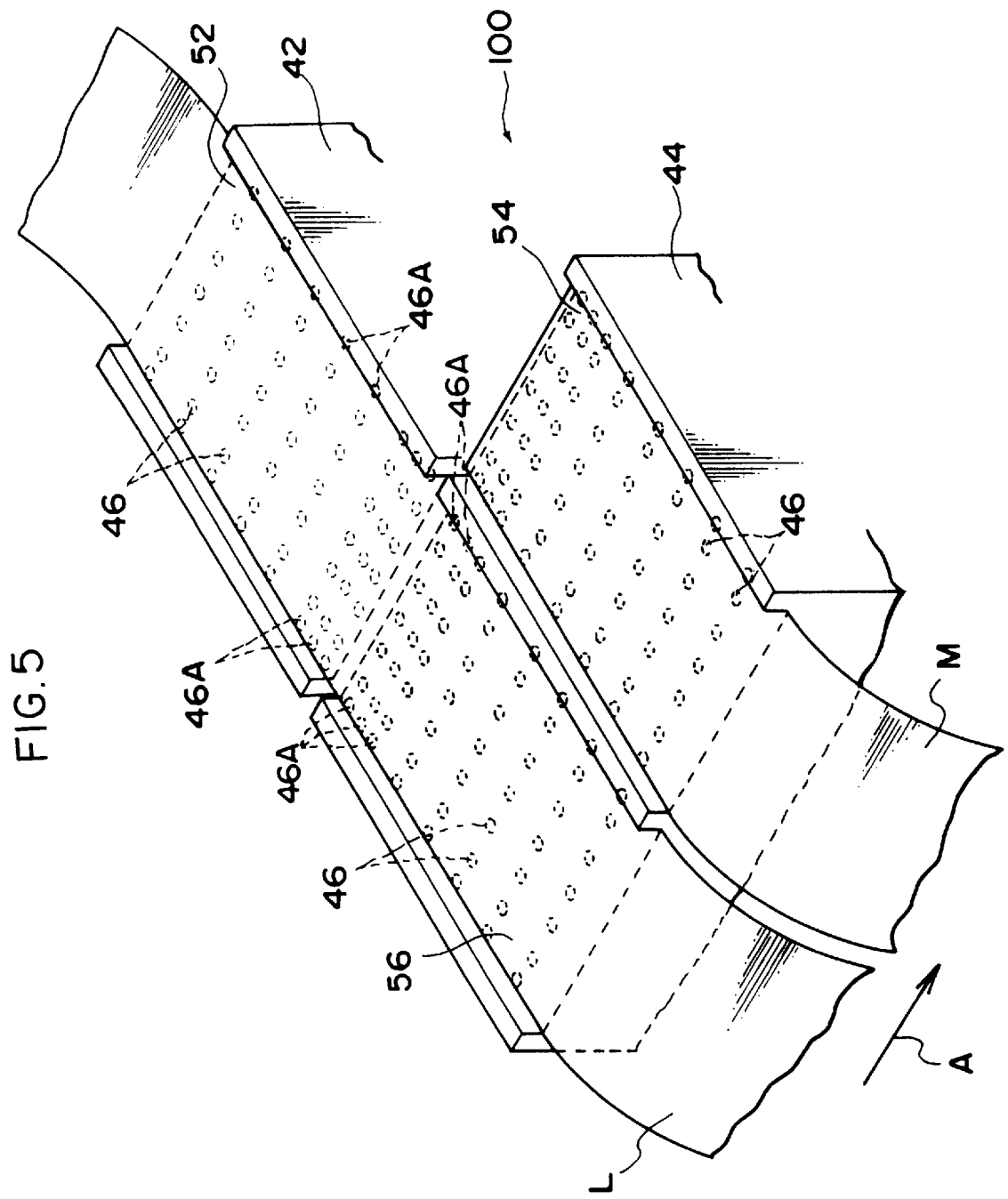
FIG. 5 is a perspective view of guide bases in accordance with the first embodiment of the present invention, and illustrates a state in which a leader tape has been placed properly.
Figure 6:
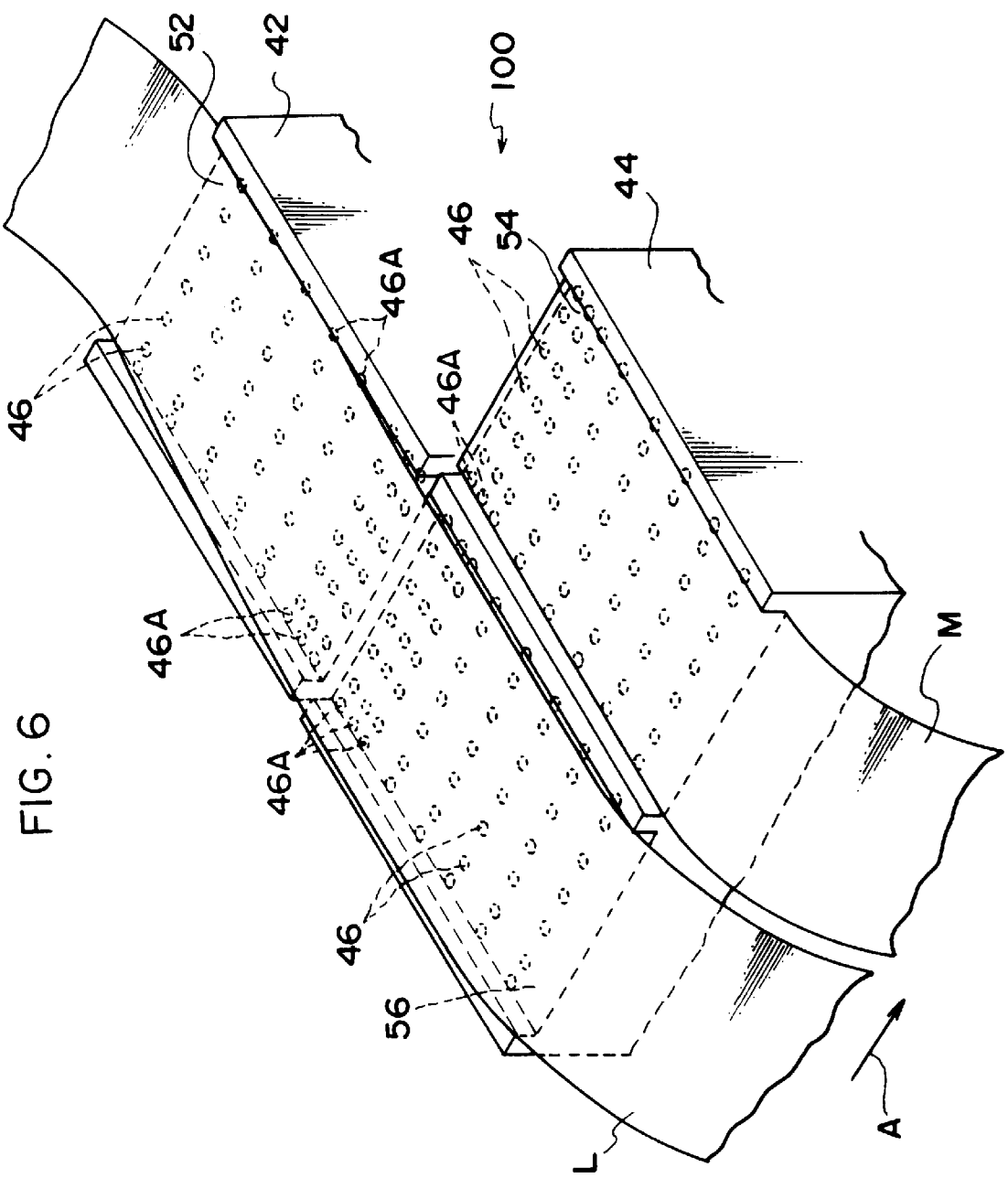
FIG. 6 is a perspective view of the guide bases in accordance with the first embodiment of the present invention, and illustrates a state in which the leader tape has been placed in an offset manner.
Figure 7:
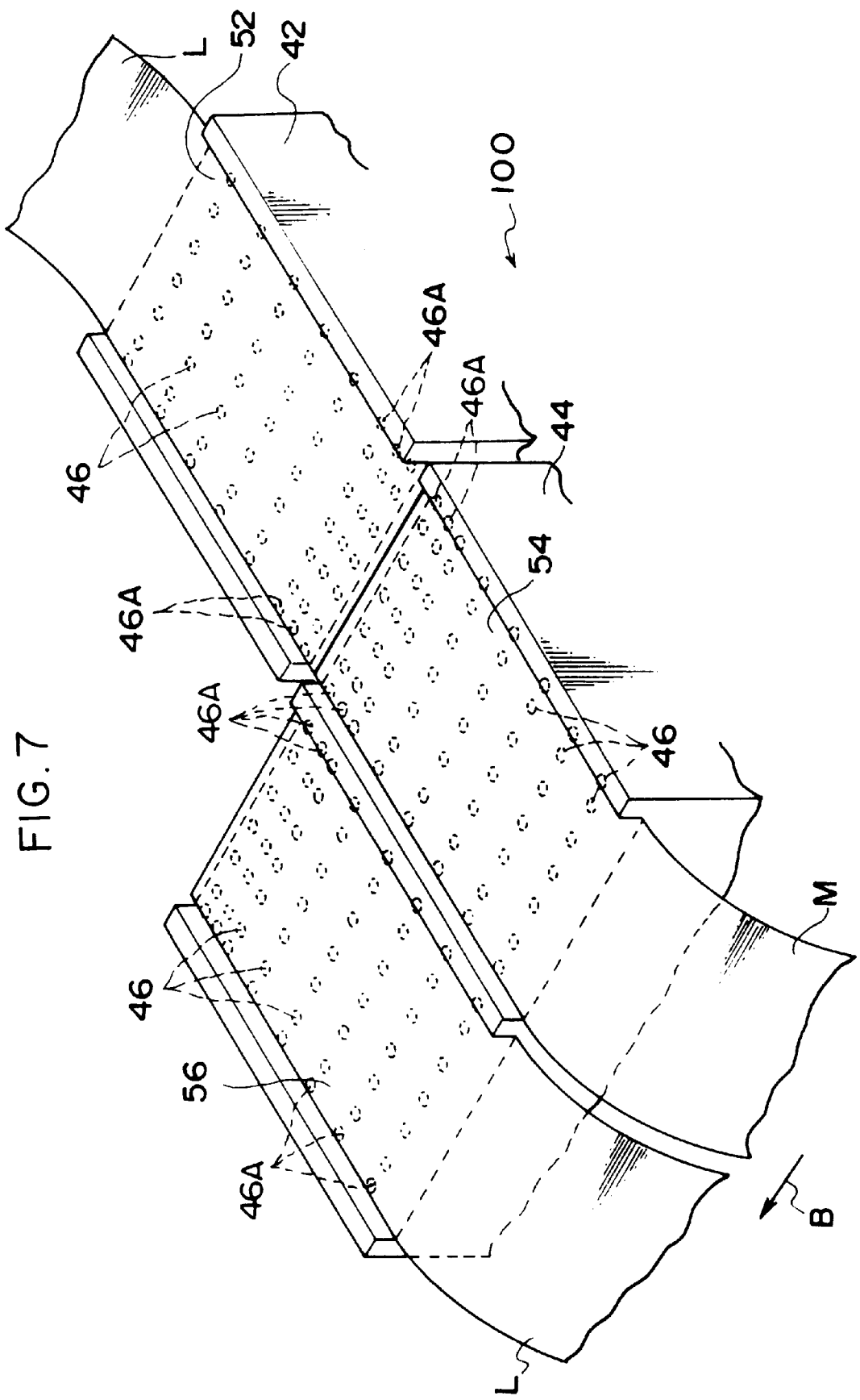
FIG. 7 is a perspective view of the guide bases in accordance with the first embodiment of the present invention, and illustrates a state in which the leader tape and the magnetic tape are made to butt against each other and are spliced.

For this reason, the arrangement provided is such that as the second guide base 44 is moved by the cylinder, the second guide base 44 is capable assuming a position in which the second guide groove 54 is aligned with the first guide groove 52, as shown in FIG. 7, and a position in which the third guide groove 56 is aligned with the first guide groove 52, as shown in FIG. 5.

Figure 8:
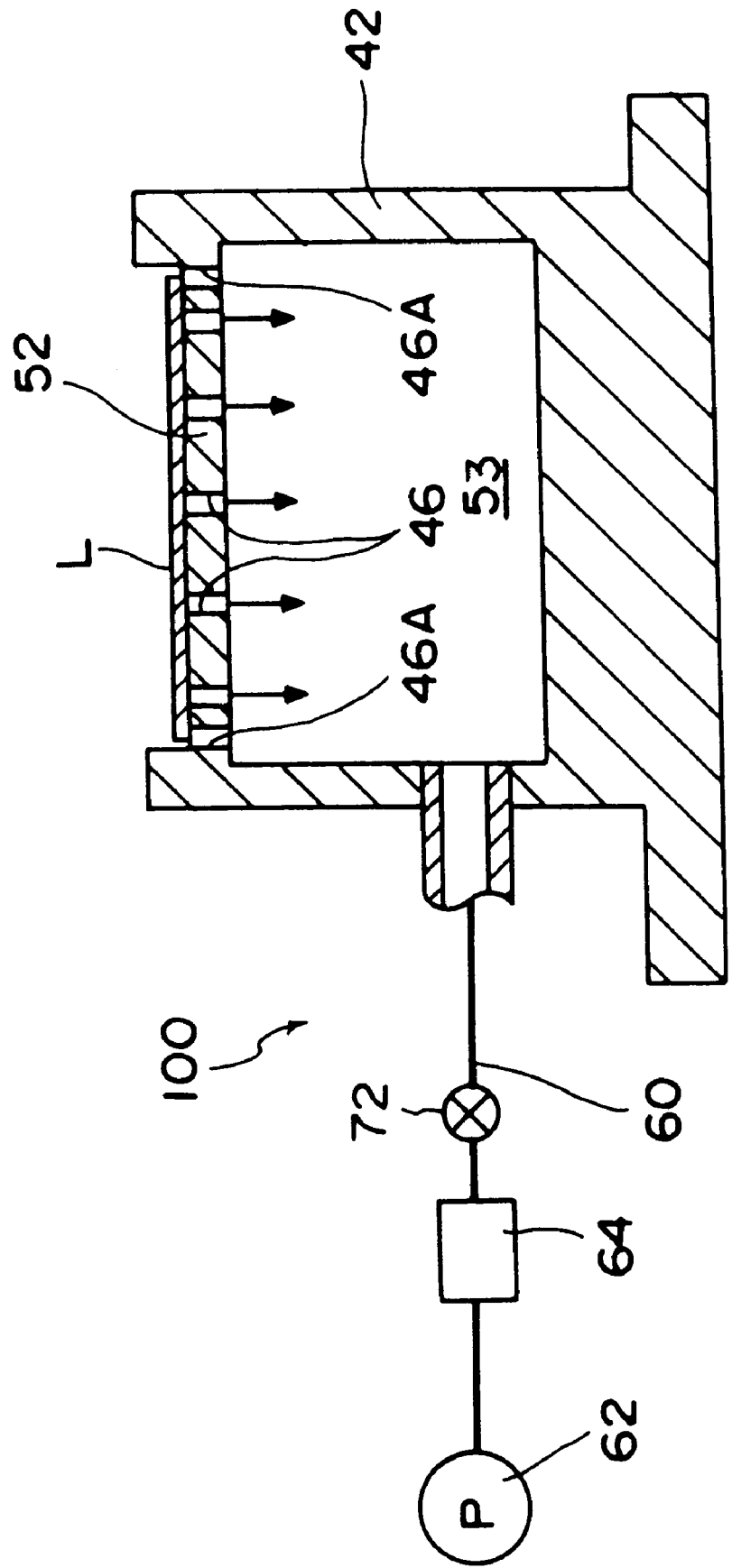
FIG. 8 is a cross-sectional view taken in the direction of arrows along line 8—8 in FIG. 4, and illustrates a state in which the leader tape has been placed properly.
Figure 9:
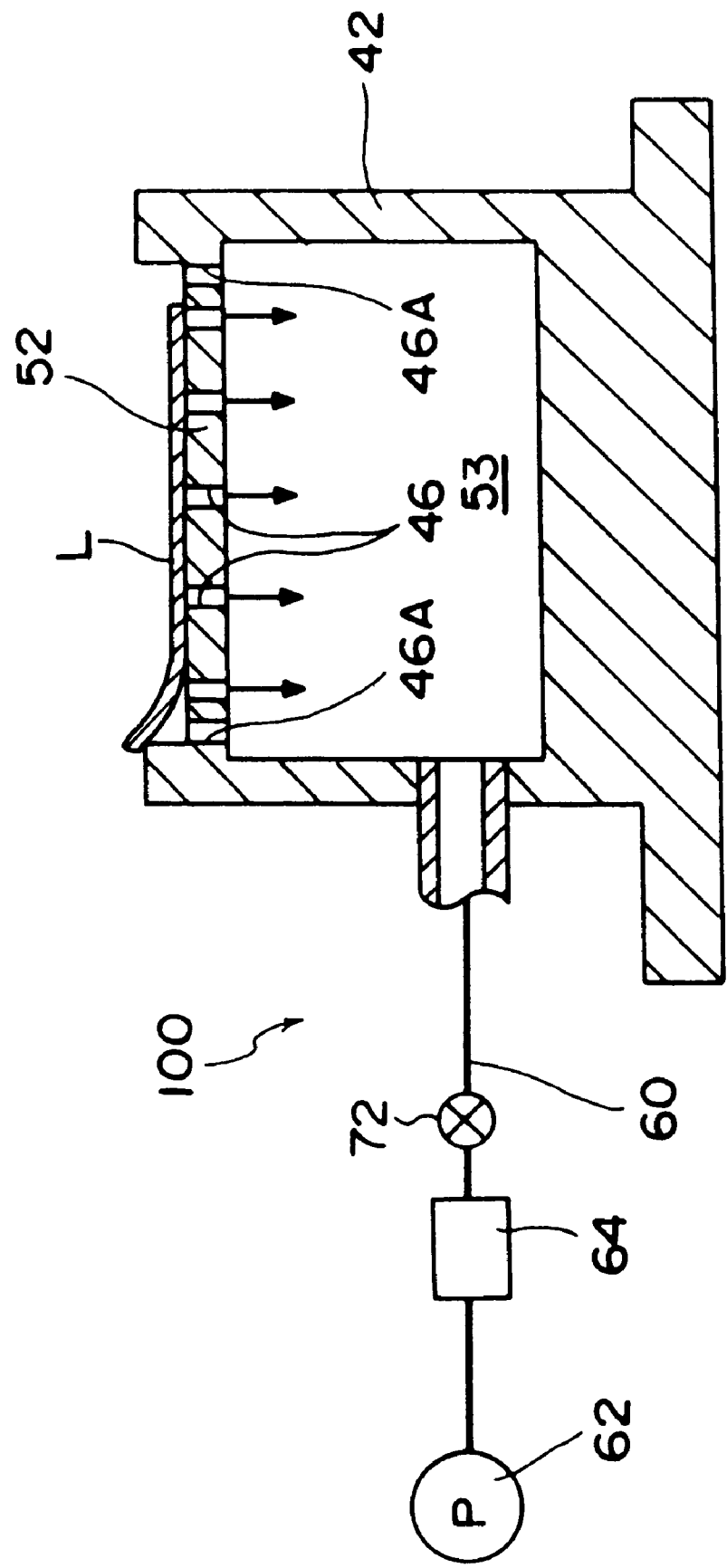
FIG. 9 is a cross-sectional view taken in the direction of arrows along line 9—9 in FIG. 4, and illustrates a state in which the leader tape has been placed in an offset manner.
Figure 10:
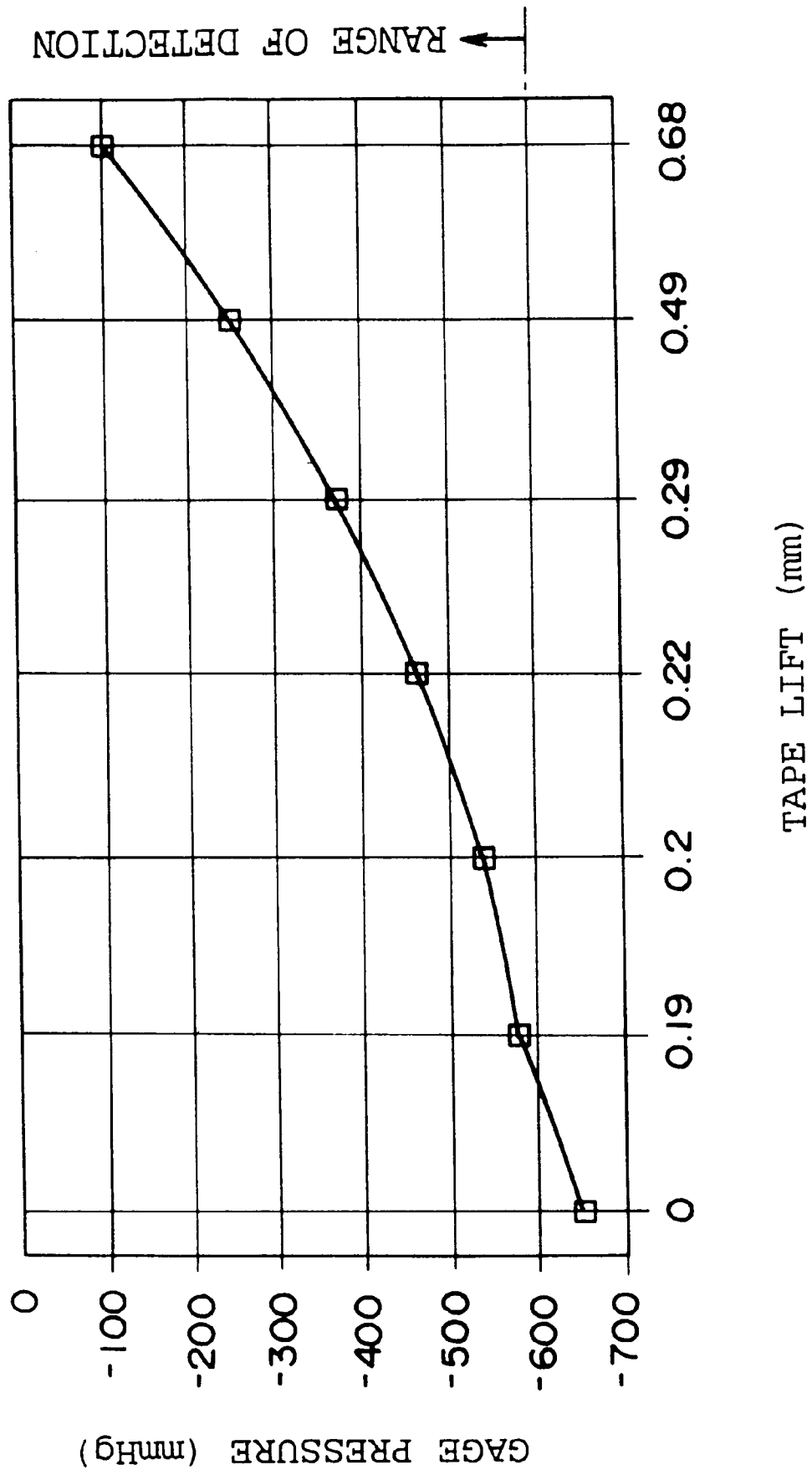
FIG. 10 is a graph illustrating the relationship between the offset of the tape and air pressure.

A multiplicity of hole portions 46 are formed in bottom portions of the respective guide grooves 52, 54, and 56 which are tape guiding portions on the first guide base 42 and the second guide base 44. Chamber spaces 53, 55, and 57 (see FIGS. 4 and 8) are provided for the hole portions 46 in the respective guide grooves 52, 54, and 56 in correspondence with the respective guide grooves. Pipes 60 are respectively connected to the chamber spaces, and these pipes 60 are respectively provided with solenoid valves 72, 74, and 76. These pipes 60 are connected to one pipe 61. A pressure sensor 64 is provided in an intermediate portion of the pipe 61, and a vacuum pump 62 is connected to one end of the pipe 61. FIG. 8 is a cross-sectional view of the first guide base 42 taken along a plane perpendicular to the longitudinal direction of the first guide groove 52, and similar structures are adopted for the second guide groove 54 and the third guide groove 56 as well. For this reason, when the tape is placed on the guide grooves 52, 54, and 56, the tape is sucked by negative pressure through the hole portions 46, thereby allowing the tape to be fixed on the guide grooves 52, 54, and 56.

Figure 4:
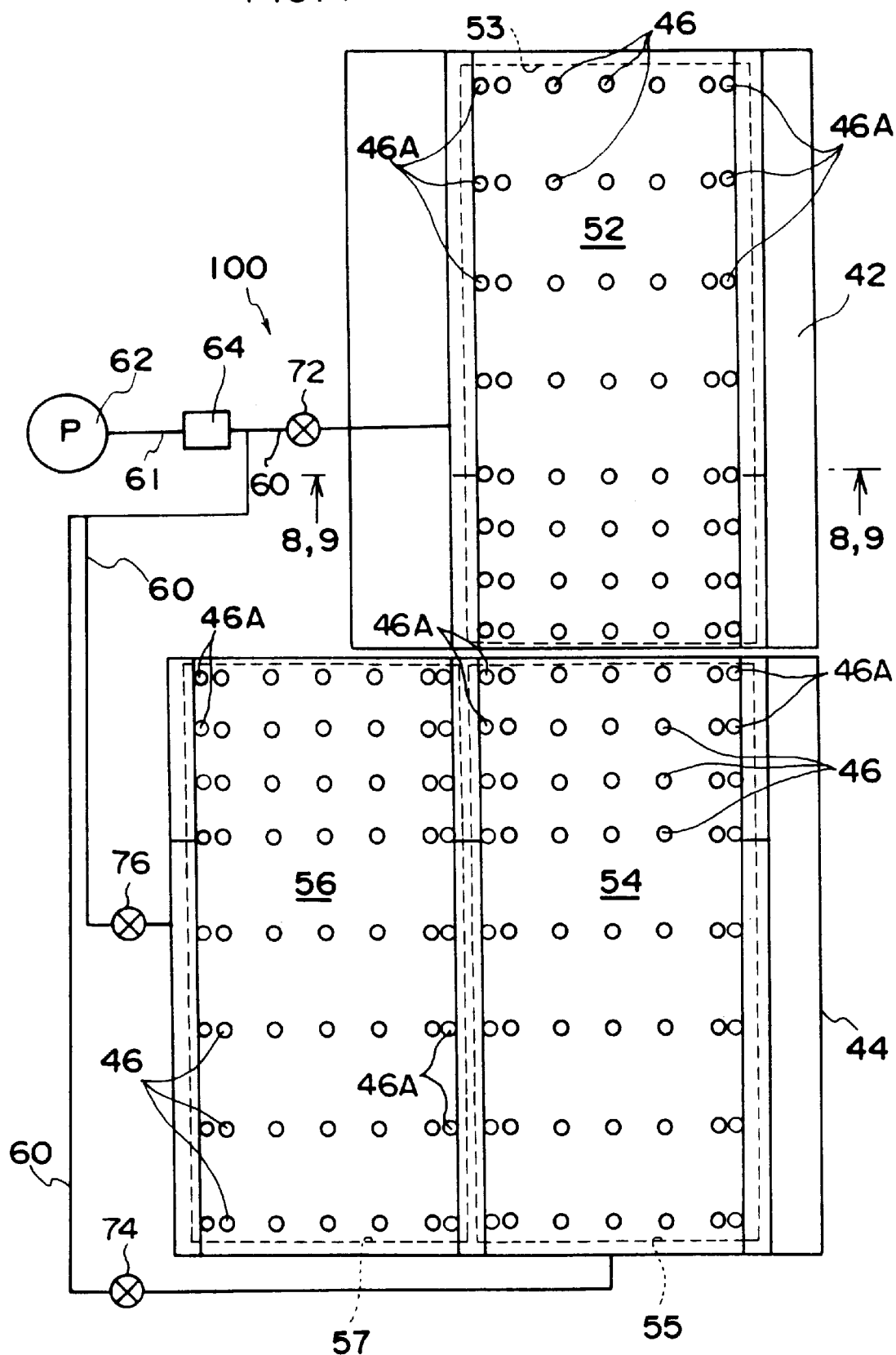
FIG. 4 is a schematic plan view of a splicing device in accordance with the first embodiment of the present invention.

The multiplicity of hole portions 46 in the respective guide grooves 52, 54, and 56 are arrayed similarly, but a plurality of hole portions 46A are formed in at least the bottom portion of the first guide groove 52, preferably in the bottom portions of all the first, second, and third guide grooves 52, 54, and 56, in such a manner as to extend along the longitudinal direction of the respective guide grooves in vicinities of their side walls at opposite ends perpendicular to their longitudinal direction at the bottom portions, preferably at positions immediately adjacent to the side walls, as shown in FIG. 4. As for the position of each hole portion 46A, the distance from the hole wall on the side wall side to the side wall [the distance (indicated by a in FIG. 13) up to a corner where the side wall rises from the bottom of the guide groove] is preferably set in the range of from 0.01 mm to 0.1 mm. The pipes 60 and the solenoid valves 72, 74, and 76 are respectively provided independently for the chamber spaces 53, 55, and 57 provided in correspondence with the respective guide grooves. The pipes 60 are then combined into one pipe, which is connected to the pressure sensor 64 capable of detecting the air pressure, and is further connected to the vacuum pump P. The solenoid valves 72, 74, and 76 are controllable independently of each other, and are capable of conducting and shutting off the suction air from the hole portions in the respective guide grooves to the vacuum pump P.

Figure 13:
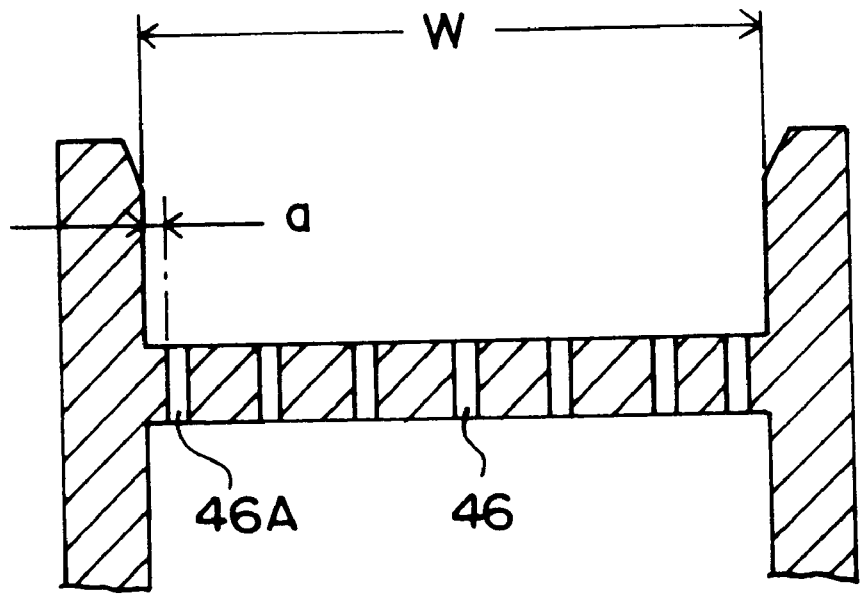
FIG. 13 is a cross-sectional view of an essential portion of the guide base in accordance with the embodiments of the present invention.
Figure 14:
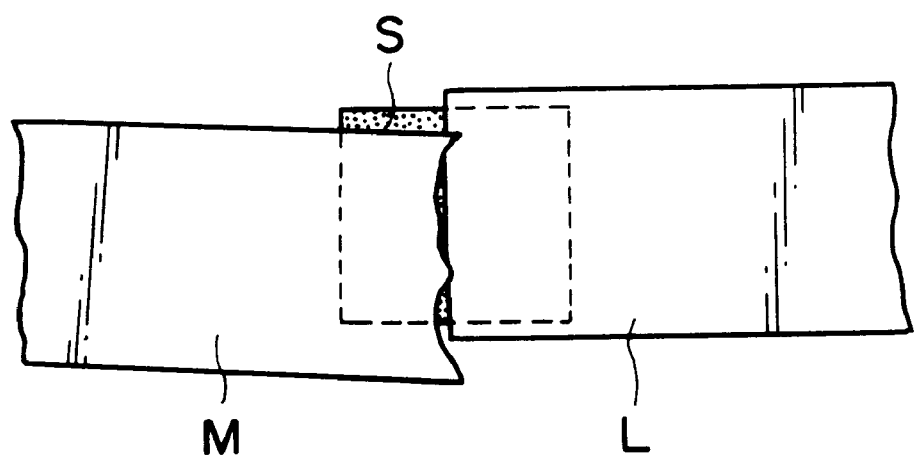
FIG. 14 is a plan view illustrating a state in which the leader tape and the magnetic tape are spliced in a conventional manner.

The diameter of each of the multiplicity of hole portions is set to an optimum value depending on the type of tape, particularly the Young's modulus and the thickness. If the hole diameters are excessively large, damage can be caused to the tape during suction (e.g., marks of the holes are left thereon), whereas if the hole diameters are excessively small, the load on the vacuum pump becomes excessively large. Accordingly, in the case of a magnetic tape, for example, the hole diameter is preferably set in the range of from 0.5 mm to 1 mm. Further, if the side walls on both sides of the guide groove are preferably inclined in the direction in which the interval between the two side walls widens after the side walls rise vertically from the bottom, as shown in FIG. 13, since the tape can be smoothly guided to the bottom of the guide groove. Further, an internal dimension W between the two side walls at the bottom is preferably made slightly wider than the tape width. In the case of the magnetic tape, for instance, W is preferably made wider than its tape width T by an amount ranging from 0.01 mm to 0.1 mm.

Meanwhile, a cutter blade 73 is disposed at a position on the baseplate 12 above the first guide base 42 and the second guide base 44. The cutter blade 73 is supported in such a manner as to be reciprocatable in the vertical direction along the surface of the baseplate 12 by an unillustrated cutting mechanism incorporated in the winding apparatus 10, and its blade portion is inclined with respect to the reciprocating direction. For this reason, as the cutting mechanism causes the cutter blade 73 to reciprocate along the baseplate 12, the leader tape L or the magnetic tape M can be cut in a state in which the tape is sucked onto and laid on the first guide base 42 and the second guide base 44.

Further, a splicer 75 is disposed at a position above the cutter blade 73 on the baseplate 12. The splicer 75 is supported in such a manner as to be capable of projecting and retracting from the baseplate 12 and of being actuated by an unillustrated splicing mechanism incorporated in the winding apparatus 10. For this reason, as the splicing mechanism causes the splicer 75 to project from the baseplate 12 and to be actuated so as to cut an unillustrated splicing tape to a predetermined length and supply the splicing tape in such a manner as to lay the splicing tape over the first guide base 42 and the second guide base 44. Hence, the leader tape L and the magnetic tape M which are respectively sucked onto the first guide base 42 and the second guide base 44 are spliced.

A splicing device 100 in accordance with this embodiment is thus comprised of the first guide base 42, the second guide base 44, the hole portions 46 and 46A, the pressure sensor 64, and so on.

Next, a description will be given of the operation and action in accordance with this embodiment.

Figure 2:
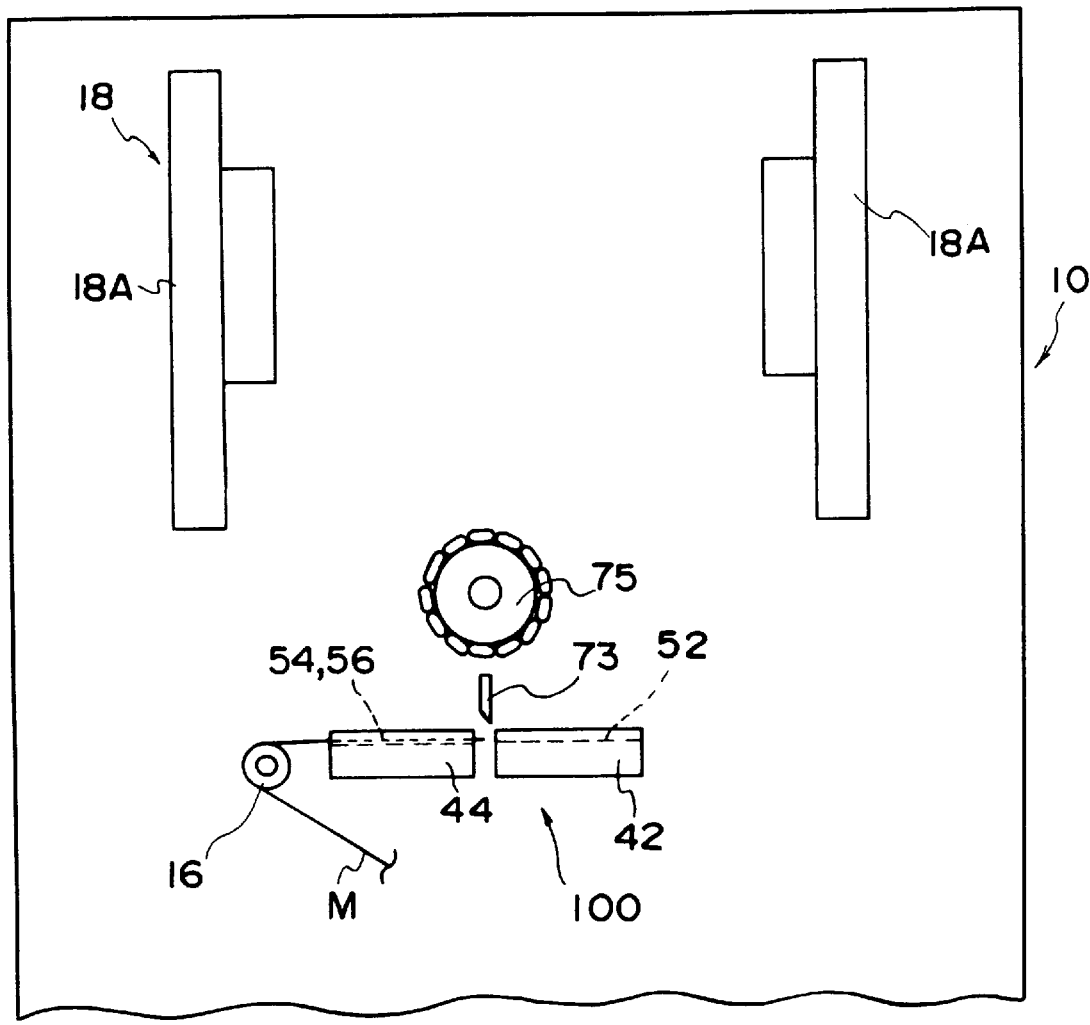
FIG. 2 is a schematic diagram of the winding apparatus to which the first embodiment of the present invention is applied, and illustrates a state before the loading of a cassette case.

The magnetic tape M is loaded in advance on the reel base 14, and is placed in the first guide groove 52 of the first guide base 42 and in the second guide groove 54 of the second guide base 44 which are arranged in the state shown in FIG. 4, such that its leading end side is placed in the guide groove 52. At this time, the solenoid valves 72 and 74 are set in a shut-off state. Then, the solenoid valves 72 and 74 are changed over to a conductive state so as to allow the magnetic tape to be sucked and held in the first guide groove 52 and the second guide groove 54. In this state, the value of air pressure during suction is monitored by the pressure sensor, and whether or not the magnetic tape is being held in a predetermined position is detected. If the value of the air pressure indicates a value higher than a predetermined low value, the solenoid valves 72 and 74 are shut off to cancel the suction and holding of the magnetic tape in the first guide groove and the second guide groove, and the position of the magnetic tape being placed in the first guide groove and the second guide groove is subsequently adjusted. Then, the solenoid valves 72 and 74 are changed over to the conductive state again so as to suck and hold the magnetic tape. Then, the value of the air pressure of the pressure sensor is monitored. Thus, if it is confirmed that the magnetic tape is being held at a predetermined position in the first guide groove and the second guide groove, the magnetic tape is cut at a position between the first guide groove and the second guide grooves by the cutter blade 73, and the magnetic tape M in the second guide groove is continued to be sucked and held, while the magnetic tape in the first guide groove is removed and discarded from the first guide groove after the solenoid valve 72 is shut off. In the above-described manner, after the magnetic tape M is threaded around the transport rollers 16, the leading end portion of the magnetic tape M is placed in the second guide groove 54 of the second guide base 44, and is set in a state of being sucked and fixed by means of the hole portions 46, as shown in FIG. 2. Hereafter, this step will be referred to as step 1.

Next, as shown in FIG. 5, the second guide base 44 is moved in the direction of arrow A by the cylinder, and the cassette case 22 is inserted into the cassette holder 18 (the insertion of the cassette holder 18 into the cassette case 22 may be effected during or before the aforementioned step 1).

Subsequently, the leader tape L is drawn out from the cassette case 22 by the pair of drawing-out rollers 32, and is placed in the first guide groove 52 of the first guide base 42 and the third guide groove 56 of the second guide base 44 in such a manner as to straddle them, as shown in FIGS. 1 and 5. At this time, the solenoid valves 72 and 76 are set in a nonconductive state, while the solenoid valve 74 is continued to be set in the conductive state. Incidentally, at this time, the cutter blade 73 and the splicer 75 are retracted into the baseplate 12, and do not hamper the drawing out of the leader tape L.

Subsequently, the solenoid valves 72 and 76 are changed over to the conductive state, so that the leader tape L is sucked by the negative pressure through the hole portions 46 and 46A, thereby fixing the leader tape L in the first guide groove 52 and the second guide groove 56. At the same time, as shown in FIG. 8, the pressure sensor 64 detects the air pressure during the suction at the hole portions 46 and 46A, thereby making it possible to detect the positional offset of the leader tape L.

That is, in a case where the leader tape L has become offset from a proper position, and has jutted out from the guide grooves 52 and 56, some of the hole portions 46A become open, and the air pressure rises. This rise in the air pressure is detected by the pressure sensor 64.

Accordingly, in the detection of the positional offset with high accuracy, it is important to dispose the hole portions 46A at positions as close to transverse side walls of the guide grooves 52 and 56 as possible. The amount of offset of the tape from the proper position (tape lift) can be determined from the value of air pressure (gage pressure) in the detection of the positional offset by monitoring such air pressure. It was possible to confirm this fact from FIG. 10 in which results of an experiment on the gage pressure and the tape lift are plotted.

In a case where the value of the air pressure shows a higher value than the predetermined low value, after the solenoid valves 72 and 76 are shut off to cancel the suction and holding of the leader tape in the first and third guide grooves, the position of the leader tape placed in the first and third guide grooves is adjusted, and the solenoid valves 72 and 76 are then changed over to the conductive state, thereby setting the leader tape in a sucked and held state. Then, the value of the air pressure of the pressure sensor is monitored.

If it is confirmed by monitoring the value of the gage pressure in the above-described manner that the leader tape is held in a predetermined position on the guide bases, a cutting operation is effected in which the leader tape L is cut by the cutter blade 73 with the leader tape L placed in the guide grooves 52 and 56 of the pair of guide bases 42 and 44. Hereafter, this step will be referred to as step 2.

Further, as shown in FIG. 7, the second guide base 44 is moved in the direction of arrow B by the cylinder, the leader tape L being sucked and held in the first guide groove 52 and the magnetic tape M being sucked and held in the second guide groove 54 are set in a butting state, and the splicing tape is attached to this butting portion. The splicing operation in which the leader tape L and the magnetic tape M are thus joined is executed by the splicer 75.

Next, after the solenoid valves 72 and 74 are shut off, and the suction at the hole portions 46 and 46A formed in the first guide groove 52 and the second guide groove 54 is temporarily stopped, the rotating shaft 30 of the motor is rotated to wind a necessary amount of the magnetic tape M onto the reel 24 on the supply side in the cassette case 22. Upon completion of the winding, after the tension of the tension roller among the transport rollers 16 is set to zero, the suction at the hole portions 46 and 46A in the guide grooves 52 and 54 is resumed to fix the magnetic tape M in the guide grooves 92 and 54.

At this time as well, the air pressure at the time when suction is effected at the hole portions 46 is monitored by the pressure sensor 64 as the gage pressure to detect the positional offset of the magnetic tape M, and if there is any positional offset, correction is made in the same way as described above.

Figure 3:
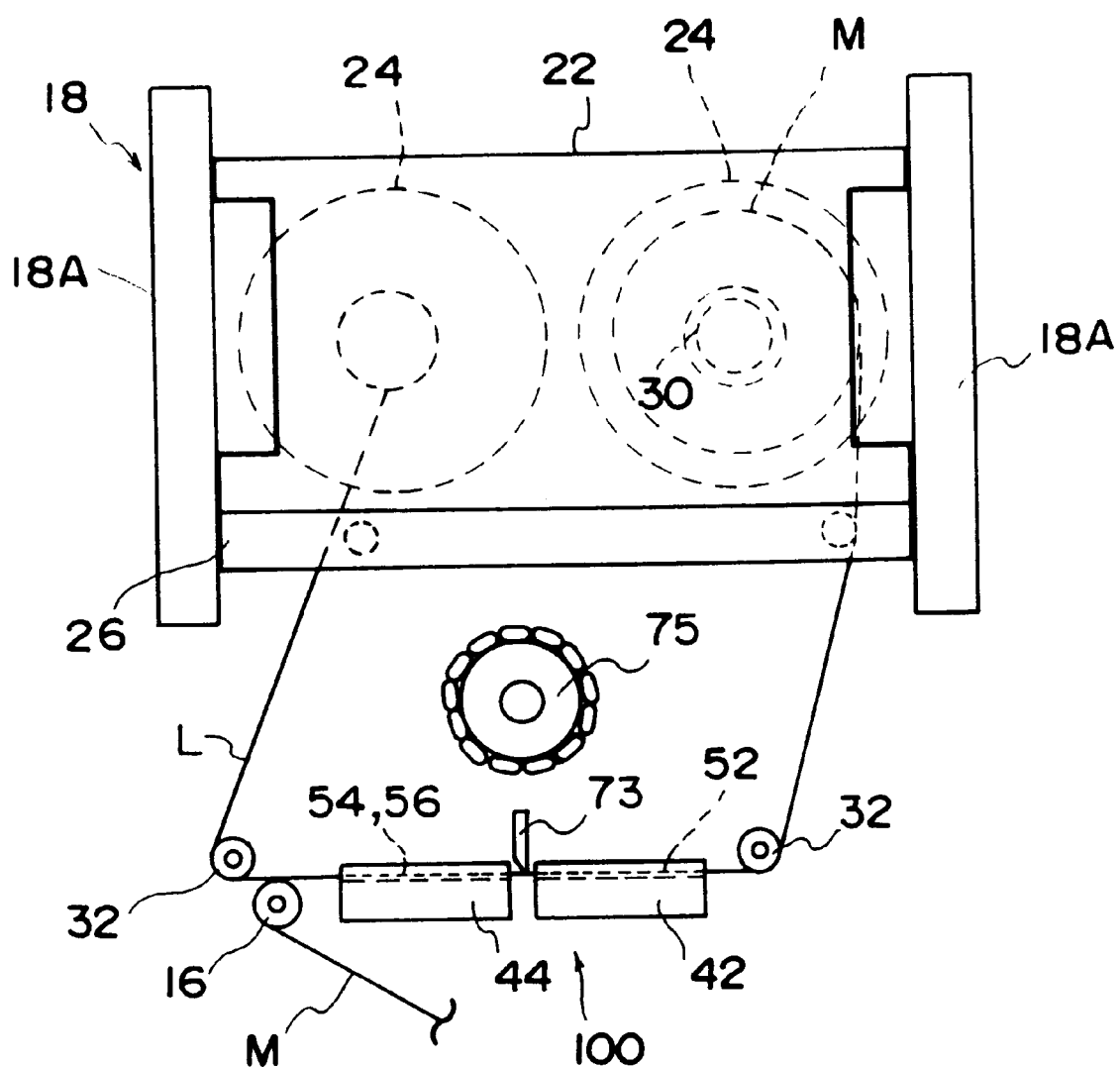
FIG. 3 is a schematic diagram of the winding apparatus to which the first embodiment of the present invention is applied, and illustrates a state after the completion of the winding of a magnetic tape.

If it is confirmed by the gage pressure that the magnetic tape M is in the proper position, the magnetic tape M is subsequently cut by the cutter blade 72, as shown in FIG. 3. Hereafter, this step will be referred to as step 3. During this step 3, the solenoid valve 76 is continued to be set in the conductive state.

Next, the second guide base 44 is moved in the direction of arrow A by the cylinder to set the first guide base 42 and the second guide base 44 in the positional relationship of step 2. Then, the ends of the leader tap L extending from the reel 24 on the takeup side (the left-side reel in FIG. 1) and being sucked and held in the third guide groove 56 and the magnetic tape M extending from the supply-side reel 24 and being sucked and held in the first guide groove are spliced by the splicer 75. Finally, the leader tape which has been drawn out from the cassette case and the magnetic tape are wound into the cassette case, which completes the magnetic tape cassette, and the cassette case 22 is discharged from the cassette holder 18. Hereafter, this step will be referred to as step 4.

Thereafter, steps 2 through 4 are repeated until the magnetic tape on the reel base 14 is used up.

As described above, if the leader tape L or the magnetic tape M is placed in the first guide groove 52 and the third guide groove 56 or the second guide groove 54 in an offset state, it becomes impossible to completely cover the hole portions 46A with the leader tape L or the magnetic tape M, so that the air pressure at the time of sucking by means of the hole portions 46 and 46A increases, and the pressure sensor 64 detects a change in the air pressure. For this reason, since the offset of the splicing portions at the time when the pair of tapes are spliced can be detected in advance by the pressure sensor 64, it becomes possible to prevent the splicing of the leader tape L and the magnetic tape M as positionally offset and to prevent the cutting of the magnetic tape M and improve the level of the quality of the magnetic tape cassette.

As a result, in accordance with the splicing device 100 of this embodiment, it is possible to accurately detect the splicing offset between the leader tape L and the magnetic tape M at a position closer to the supply-side reel 24. For this reason, upon detection of such offset, it is possible to interrupt the production of the magnetic tape cassette and issue an alarm, allowing an operator to make correction or to have the cassette case 22 discarded.

Accordingly, at the time of splicing of tapes using the winding apparatus 10, an inspection operator for visual inspection is not required, so that productivity improves and the production cost can be reduced. Further, in a conventional case where inspection is conducted by an inspecting machine after the winding of the magnetic tape M, a space for installation of the inspecting machine and an equipment investment would be required, and the production cost would therefore increase. In accordance with this embodiment, however, such requirements are not entailed, making it possible to reduce the production cost. Stable accurate inspection becomes possible at a low cost which involves merely the addition of the pressure sensor 64.

Further, in the conventional case where inspection is conducted by the inspecting machine after the winding of the magnetic tape M, there are cases where faulty splicing continues to occur until defects are detected in an inspection process. In accordance with this embodiment, however, it is possible to prevent the occurrence of such cases.

Next, referring to FIG. 11, a description will be given of a second embodiment of the splicing device and method in accordance with the present invention. Incidentally, the same members as those described in the first embodiment will be denoted by the same reference numerals, and a description thereof will be omitted.

Figure 11:
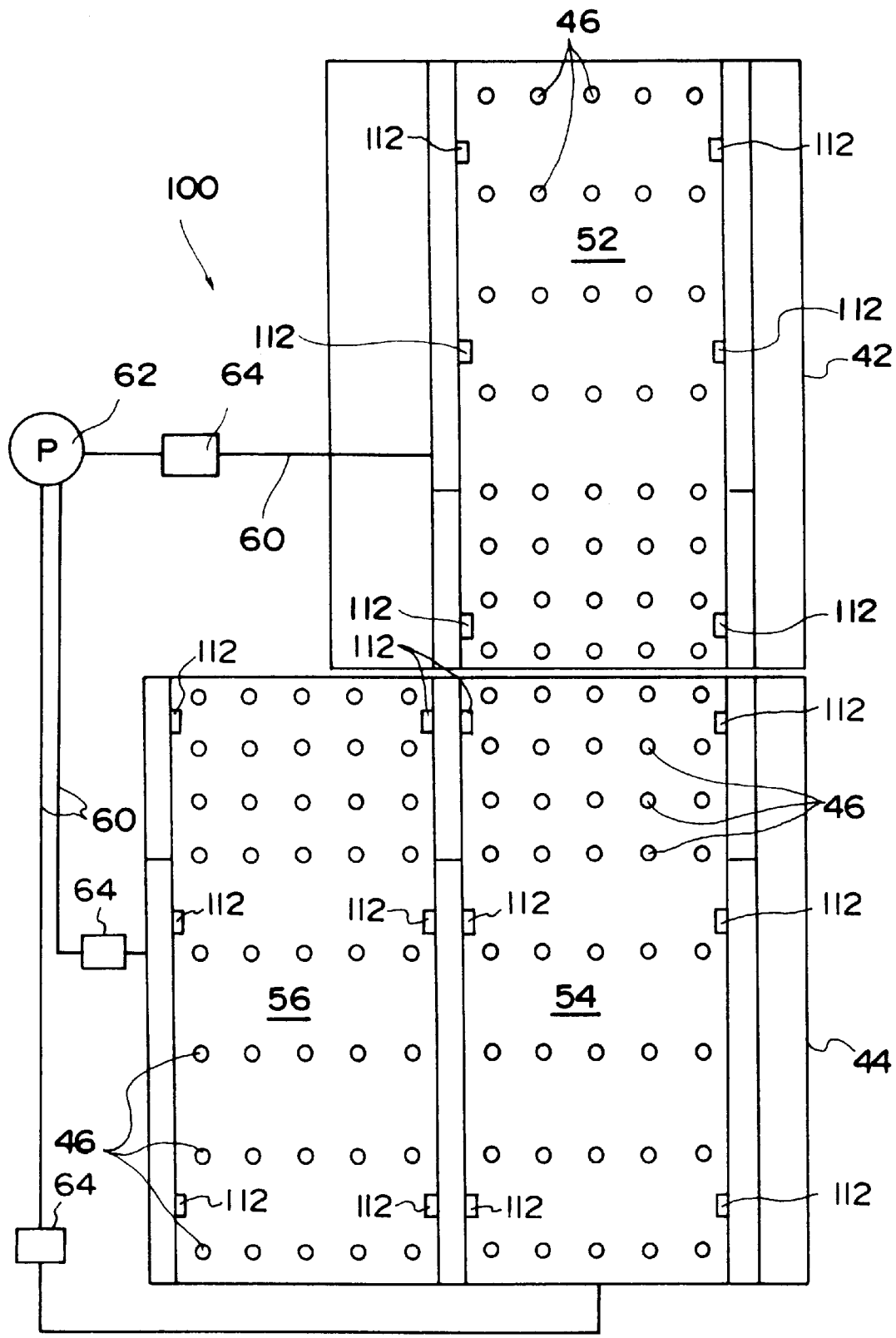
FIG. 11 is a schematic plan view of the splicing device in accordance with a second embodiment of the present invention.

As shown in FIG. 11, instead of providing the plurality of round hole portions 46A along the longitudinal direction of the first, second, and third guide grooves 52, 54, and 56, a plurality of square hole portions 112 are provided along the longitudinal direction in the vicinities of their groove ends (side walls) of the first, second, and third guide grooves 52, 54, and 56 in accordance with this embodiment. For this reason, by virtue of these hole portions 112, this embodiment is able to demonstrate action similar to that of the first embodiment.

Next, referring to FIG. 12, a description will be given of a third embodiment of the splicing device and method in accordance with the present invention. Incidentally, the same members as those described in the first embodiment will be denoted by the same reference numerals, and a redundant description thereof will be omitted.

Figure 12:
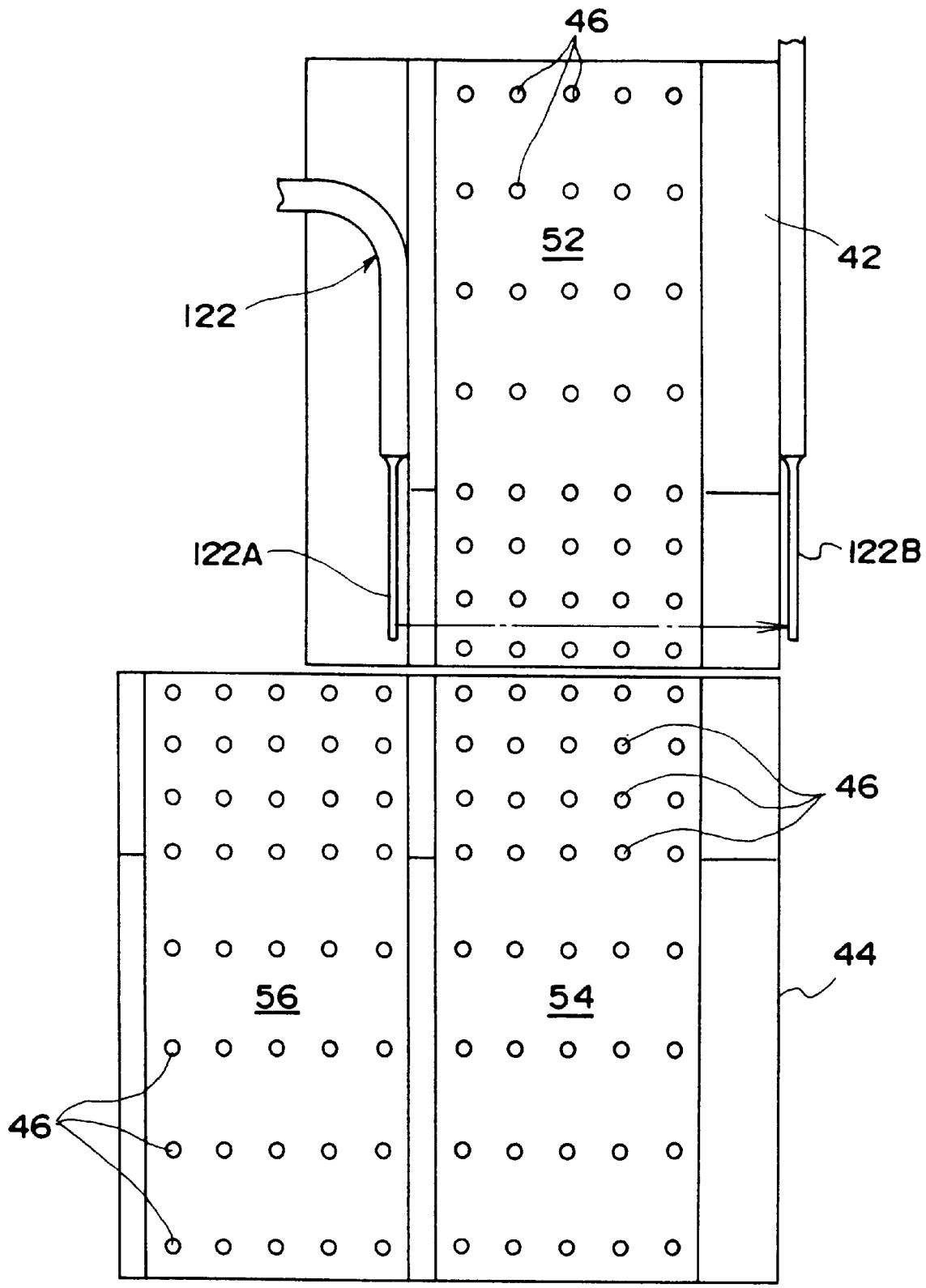
FIG. 12 is a schematic plan view of the splicing device in accordance with a third embodiment of the present invention.

As shown in FIG. 12, instead of providing the plurality of hole portions 46A, a transmission type fiber sensor 122, which is an optical sensor, is disposed on both sides of the first guide groove 52 of the first guide base 42 in accordance with this embodiment. The arrangement provided is such that the offset of the tape can be detected by depending on whether or not the light emitted from a light-emitting portion 122A of the transmission-type fiber sensor 122 is received by a light-receiving portion 122B, or by an amount of its received light. Namely, if the tape is offset from the predetermined position, the tape rides onto one of the opposite side walls of the first guide groove 52 and blocks the optical path, so that the amount of light received by the light-receiving portion 122B declines, thereby making it possible to detect the positional offset.

In other words, this embodiment only has the difference that the offset of the tape is detected by the transmission-type fiber sensor 122, i.e., an optical sensor, instead of detecting the offset of the tape by the pressure sensor 64. Hence, this embodiment is able to demonstrate action similar to that of the first and second embodiments.

It should be noted that, instead of the above-described embodiment, an unillustrated CCD camera may be adopted as the optical sensor.

That is, the CCD camera is installed above a tape guiding portion, and an ultraviolet-ray reflecting region is formed in advance on the surface of the tape guiding portion, such that if the tape held therein is in a predetermined position, the ultraviolet-ray reflecting region is completely covered, but if it is offset from the predetermined position, the ultraviolet-ray reflecting region is not completely covered.

Then, an image of the tape being held in the tape guiding portion is shot by the CCD camera from above, and the shot image is obtained only with the ultraviolet light by the CCD camera. If the shot image is then transformed into a binary image of a tape portion and the remaining portion, it is easily possible to detect whether or not the tape being held in the tape guiding portion is in the predetermined position.

Meanwhile, although in the above-described third embodiment the optical sensor is disposed only for the first guide groove 52 of the first guide base 42, optical sensors or the like may also be disposed for the second guide groove 54 and the third guide groove 56 of the second guide base 44 in the same way as in the first and second embodiments. In this case, there is an advantage in that it is possible to determine the guide groove where the positional offset of the tape has occurred.

Further, as the pressure sensor, it is conceivable to use a liquid column manometer, an elastic manometer such as a Bourdon tube type, or the like. In addition, as the optical sensor, it is conceivable to use a sensor capable of image processing other than a CCD camera, but the present invention is not limited to the same.

On the other hand, in the above-described embodiments a description has been given of the winding apparatus in which the magnetic tape is wound onto the reel in a state in which the pair of reels are placed in the cassette case. However, the present invention may be also applied to cases where the magnetic tape is wound around a pair of reels or hubs which are not placed in the cassette case, and is thereby set in a so-called state of eyeglasses. In addition, the present invention may be applied to cases where sheet-like nonadherent materials other than tapes are spliced.

What is claimed is:

1. A splicing method comprising the steps of:
   (a) holding a first tape on a first tape guiding portion and a second tape guiding portion which are positioned in alignment with each other, at least one of said first tape guiding portion and said second tape guiding portion being movable between a first position, at which said first tape guiding portion and said second tape guiding portion are in alignment with each other, and a second position, which is a position withdrawn from the first position;
   (b) cutting the first tape between said first tape guiding portion and said second tape guiding portion so as to allow a first end portion held on said first tape guiding portion and a second end portion held on said second tape guiding portion to be formed in the first tape; and
   (c) splicing one of the first end portion and the second end portion to a second tape,
   wherein a step (d) of detecting, by a tape-holding-position detector which is provided at at least one of said first tape guiding portion and said second tape guiding portion, whether or not at least one of a portion of the first tape being held on said first tape guiding portion and a portion of the first tape being held on said second tape guiding portion is in a predetermined holding position is effected prior to said step (c), and when said at least one is in the predetermined holding position, said step (c) is effected.

2. A splicing method according to claim 1, wherein said step (d) is effected prior to said step (b).

3. A splicing method according to claim 2, wherein said step (d) is effected as the first tape is sucked onto said first tape guiding portion and said second tape guiding portion by negative pressure through a multiplicity of ventilation holes formed in said first tape guiding portion and said second tape guiding portion, and the detection in said step (d) is effected on the basis of a value of the negative pressure in at least one of said first tape guiding portion and said second tape guiding portion.

4. A splicing method according to claim 2, wherein said step (d) is effected by optically detecting a position of the first tape placed on at least one of said first tape guiding portion and said second tape guiding portion.

5. A splicing method comprising the steps of:
   (a) holding a first tape on a first tape guiding portion and a second tape guiding portion which are positioned in alignment with each other, at least one of said first tape guiding portion and said second tape guiding portion being movable between a first position, at which said first tape guiding portion and said second tape guiding portion are in alignment with each other, and a second position, which is a position withdrawn from the first position;
   (b) detecting, by a tape-holding-position detector which is provided at said first tape guiding portion and said second tape guiding portion, whether or not both a portion of the first tape held being held on said first tape guiding portion and a portion of the first tape being held on said second tape guiding portion are respectively in predetermined holding positions;
   (c) cutting the first tape between said first tape guiding portion and said second tape guiding portion so as to allow a first end portion held on said first tape guiding portion and a second end portion held on said second tape guiding portion to be formed in the first tape if it is detected in said step (b) that said both are in the predetermined holding positions; and
   (d) causing said second tape guiding portion to hold one end portion of the second tape after removing the second end portion from said second tape guiding portion, positioning the first end portion being held on said first tape guiding portion with respect to the one end portion of the second tape, and splicing the first end portion and the one end portion of the second tape.

6. A splicing method according to claim 5, wherein the positioning in said step (d) is effected by aligning said first tape guiding portion holding the first end portion with said second tape guiding portion.

7. A splicing method according to claim 5, wherein the splicing in step (d) is effected by attaching a splicing tape onto the one end portion of the second tape and the first end portion in a straddling manner.

8. A splicing method according to claim 5, wherein said step (b) is effected as the first tape is sucked onto said first tape guiding portion and said second tape guiding portion by negative pressure through a multiplicity of ventilation holes formed in said first tape guiding portion and said second tape guiding portion, and the detection in said step (d) is effected on the basis of a value of the negative pressure in said first tape guiding portion and said second tape guiding portion.

9. A splicing method according to claim 5, wherein said step (b) is effected by optically detecting a position of the first tape placed on said first tape guiding portion and said second tape guiding portion.

10. A splicing device comprising:
    a first tape guiding portion and a second tape guiding portion at least one of which is movable between a first position, at which said first tape guiding portion and said second tape guiding portion are in alignment with each other, and a second position, which is a position withdrawn from the first position;
    a tape cutting mechanism for causing a first tape being held on said first tape guiding portion and said second tape guiding portion, which are positioned in alignment with each other, in a straddling manner to be cut between said first tape guiding portion and said second tape guiding portion;
    a splicing mechanism for splicing a cut end of the first tape being held on one of said first tape guiding portion and said second tape guiding portion and a second tape being held in another one of said first tape guiding portion and said second tape guiding portion; and
    tape-holding-position detector which is provided at at least one of said first tape guiding portion and said second tape guiding portion, and which is adapted to detect whether or not the first tape is in a predetermined holding position when the first tape is held on said first tape guiding portion and said second tape guiding portion in such a manner as to straddle said first tape guiding portion and said second tape guiding portion.

11. A splicing device according to claim 10, further comprising sucking means which is disposed at said first tape guiding portion and said second tape guiding portion, and which is adapted to suck and hold the first tape.

12. A splicing device according to claim 11, wherein said sucking means includes a plurality of ventilation holes formed in each of said first tape guiding portion and said second tape guiding portion and a vacuum pump for providing negative pressure to the first tape through the plurality of ventilation holes.

13. A splicing device according to claim 12, wherein said tape-holding-position detecting means includes a pressure sensor for detecting a value of the negative pressure.

14. A splicing device according to claim 13, wherein said first tape guiding portion and said second tape guiding portion are respectively provided with a first groove having a substantially flat bottom and a second groove having a substantially flat bottom, and the first tape is positioned on the bottoms of said first groove and said second groove in a case where the first tape is positioned in the predetermined holding position.

15. A splicing device according to claim 14, wherein the plurality of ventilation holes in said first tape guiding portion and said second tape guiding portion are provided in the respective bottoms of said first groove and said second groove.

16. A splicing device according to claim 15, wherein the plurality of ventilation holes in said first tape guiding portion and said second tape guiding portion include ventilation holes provided in close vicinity to opposite side walls of each of said first groove and said second groove.

17. A splicing device according to claim 10, wherein said tape-holding-position detecting means includes an optical sensor for optically detecting whether or not the first tape is in the predetermined holding position.

18. A splicing device according to claim 12 wherein the diameter of each hole is in the range of 0.5 mm to 1 mm.

19. A splicing device according to claim 13 further comprising a pipe having one end connected to the vacuum pump and the other end connected to a plurality of pipes wherein the plurality of pipes are connected to the tape guide portions through a valve.

20. A splicing device according to claim 19 wherein each valve is independently controlled to alternately allow connection and block connection from the holes of the tape guiding portion to the vacuum pump.

21. A splicing device according to claim 16 wherein at least one of the ventilation holes is spaced from the side wall in the range from 0.01 mm to 0.1 mm.

22. A splicing device according to claim 20 wherein an interval (W) between the opposite side walls is 0.01 to 0.1 mm greater than a width (T) of the first and second tape.

23. A splicing device according to claim 16 wherein each wall extends perpendicularly upward from the bottom and thereafter is inclined outward wherein the space between the opposite side wall increases.

24. A splicing device comprising:

a first tape guiding portion which is fixedly disposed;

a second tape guiding portion which is movable between a first position for aligning said second tape guiding portion with said first tape guiding portion and a second position which is retreated from the first position;

a cutting mechanism for causing a first tape being held on said first tape guiding portion and said second tape guiding portion and said second tape guiding portion in a straddling manner to be cut between said first tape guiding portion and said second tape guiding portion in a state in which said second tape guiding portion is positioned in the first position;

a splicing mechanism for splicing with a splicing tape an end of the first tape held on said second tape guiding portion and cut by said cutting mechanism and an end of a second tape being held in said first tape guiding portion; and tape-holding-position detector which is provided at at least said first tape guiding portion between said first tape guiding portion and said second tape guiding portion, which is capable of detecting whether or not the first tape is in a predetermined holding position on said first tape guiding portion when the first tape is held on said first tape guiding portion and said second tape guiding portion in such a manner as to straddle said first tape guiding portion and said second tape guiding portion, and which is capable of detecting whether or not the second tape is in the predetermined holding position when the second tape is held in said first tape guiding portion.

* * * * *